United States Patent [19]

Maxey et al.

[11] 4,298,286
[45] Nov. 3, 1981

[54] MEASURING APPARATUS

[75] Inventors: Carl W. Maxey, Corvallis, Oreg.; Warren Leyde, Seattle, Wash.

[73] Assignee: The Carl Maxey Company, Corvallis, Oreg.

[21] Appl. No.: 155,500

[22] Filed: Jun. 2, 1980

[51] Int. Cl.³ .............................................. G01B 11/06
[52] U.S. Cl. .................................................... 356/381
[58] Field of Search ................. 356/376, 381; 250/559

[56] References Cited
U.S. PATENT DOCUMENTS

3,187,185  6/1965  Milnes ................................. 356/381
3,994,589  11/1976  Nodwell et al. ...................... 356/381

Primary Examiner—R. A. Rosenberger
Attorney, Agent, or Firm—Kolisch, Hartwell & Dickinson

[57] ABSTRACT

Apparatus designed to measure, within a selectively variable defined range, the distance of an object's surface from opposite sides of a predetermined datum plane. The apparatus includes two pairs of light sources which are disposed on one side of the datum plane, and on opposite sides of a reflection viewing plane which is normal to the datum plane. In each source pair, the two sources are energized alternately to create, on opposite sides of the datum plane, and with regard to the viewing plane, alternate upper and lower preferential illumination zones. A photodetector, which "looks" for reflections along the viewing plane, has its output signal coordinately gated in such a manner that the level of such signal is directly interpretable to indicate the distance of a reflecting surface from the datum plane, as well as the side of such plane on which the surface is located.

5 Claims, 8 Drawing Figures

MEASURING APPARATUS

BACKGROUND AND SUMMARY OF THE INVENTION

This invention pertains to non-contacting distance-measuring apparatus, and more particularly, to such apparatus which employs alternately energized light sources, and a photodetector, to perform such measuring. For the purpose of illustration herein, a perferred embodiment of the invention is described in connection with monitoring the surface profiles of log cants which are being prepared for feeding into an edger in a saw mill.

There are numerous applications, particularly in the processing of different materials, where it is economically important, and even critical, to monitor closely the surface profile of an object during its processing. For example, in the wood products industry, prudent handling of logs in a saw mill dictates the necessity for close monitoring of the sawn products in order to maximize lumber yield, and hence economy. One of the areas in a saw mill where strong improvement has been required has been in the edging of log cants to remove what are referred to as the wane areas in a cant. As is well known to those skilled in the art, a cant is that which is sawn directly from a whole log, and the wane in a cant appears at the edges thereof which are defined by the outside circumference of the original log. In the past, a variety of techniques, including manual "eye balling", have been used to determine where, in relation to the saw line for an edger saw, a particular cant should be placed to remove its wane areas, to yield the largest possible board of the highest quality.

A general object of the present invention is to provide apparatus, usable in a setting like that just described, to perform, as accurately and simply as possible, such a surface-distance measuring and monitoring operation.

More particularly, an object of the invention is to provide such apparatus which, within a definable and selectively variable range, is capable, with a high degree of resolution, of locating the surface of an object relative to opposite sides of a defined datum plane.

According to a preferred embodiment of the invention, described herein, the same features two pairs of light sources which are disposed on one side of such a defined plane, and on opposite sides of what is referred to as a reflection viewing plane which is normal to the datum plane. In each of the pairs of sources, two light-emitting diodes are used which are energized alternately to create, on opposite sides of the datum plane, and with regard to the reflection viewing plane, alternate upper and lower zones of illumination which may be thought of as intersecting generally along a common line which is defined by the line of intersection of the datum and viewing planes.

A photodetector, which is on the same side of the datum plane as the light sources, looks for reflections along the viewing plane, and produces an output signal whose level directly follows the level of light reflection from the sources returning from an object's surface which is illuminated by the sources. The output signal from the photodetector is gated into a sample-and-hold circuit in such a manner that its signal is directly interpretable not only to indicate the distance of a reflecting surface from the datum plane, but also the side of such plane on which the reflecting surface is located. In other words, the output signal from the photodetector is gated to coincide with the alternate energizing times for the light sources, whereby its output signal can be determined as having resulted from reflected illumination resulting from illumination by particular ones of the sources. With two different sources in each pair producing preferential illumination zones on opposite sides of the datum plane, and with the output signal from the photodetector gated to sample-and-hold circuits, the side of the datum plane on which the reflecting surface resides is easily determinable.

Employed in the apparatus of the invention, in the circuitry which monitors the output signal from the photodetector, is a differential amplifier in which what might be thought of as the "viewing" range of the apparatus is definable and selectively variable to expand and contract the range. For example, the range not only may be expanded and contracted, but also may be shifted as a whole relative to what has been referred to hereinabove as the datum plane. In other words the range may have a major portion shifted either above or below the datum plane, depending upon the particular application.

The apparatus of the invention is easily installed in a variety of settings without requiring any significant modification of existing equipment, operates at extremely low power levels, and requires virtually no maintenance.

These and other objects and advantages which are attained by the invention will become more fully apparent as the description which now follows is read in conjunction with the accompanying drawings.

DETAILED DESCRIPTION OF THE INVENTION

Figure 1:
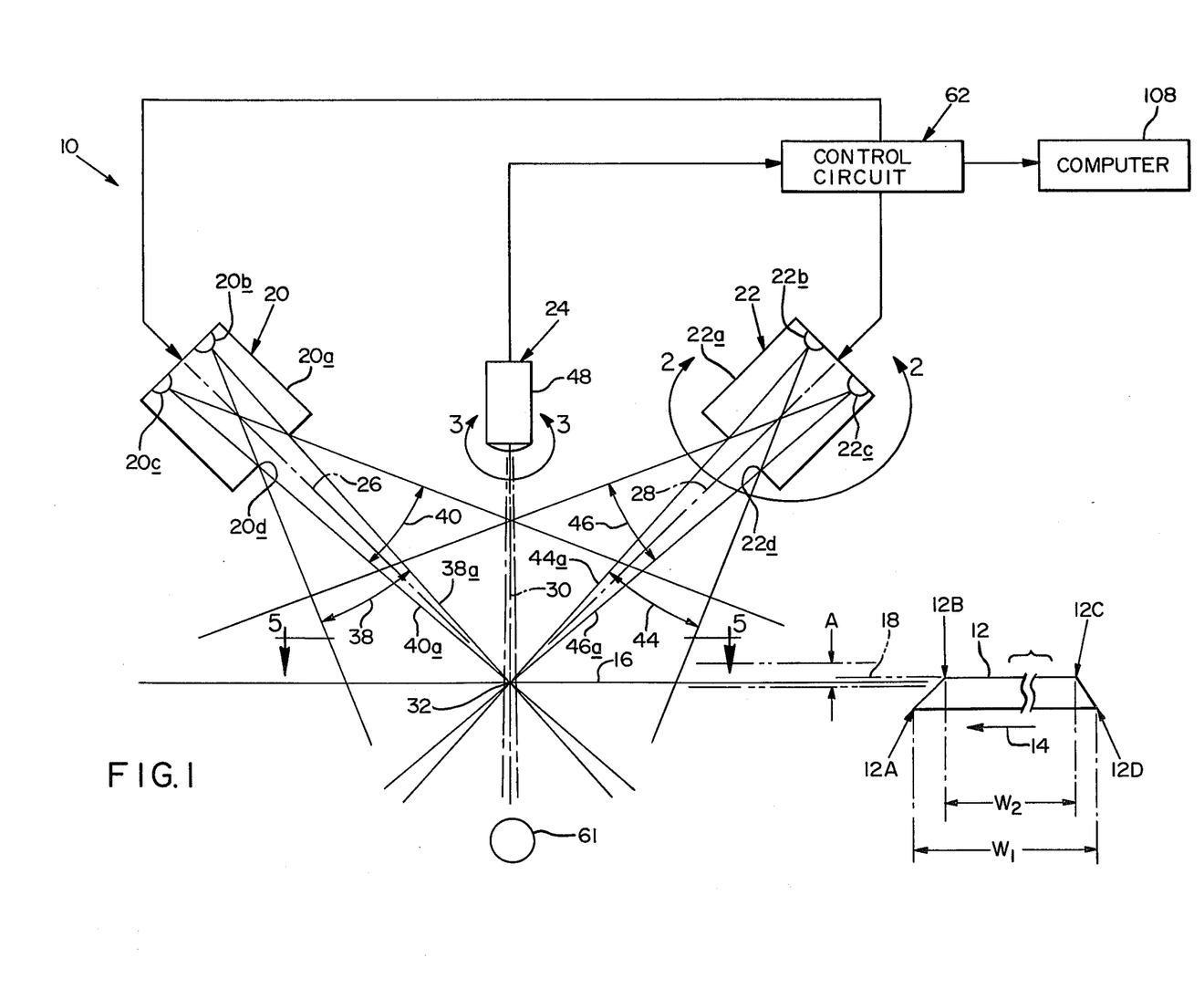
FIG. 1 is a simplified schematic view illustrating the apparatus of the present invention installed to monitor the profiles of cants in a saw mill.

Turning now to the drawings, and referring first of all to FIG. 1, indicated generally at 10 is a distance-measuring or surface-profiling apparatus constructed in accordance with the present invention. In the particular setting in which apparatus 10 is used, as will be outlined, the same is referred to as a scanner, and thus will be so referred to hereinafter. This apparatus forms part of a chain of equipment installed in a modern saw mill.

Scanner 10, as shown, is employed to monitor the cross-sectional profile of a portion of a cant which passes beneath it, from right to left in the figure, on its way to an edger saw which is used to remove the wane areas from the cant. Such a cant is shown toward the lower right corner of FIG. 1 at 12, and through the operation of a suitable conventional transport mechanism, is approaching what might be thought of as the viewing station for scanner 10 in the direction of arrow 14. Each cant which is viewed typically has a length of about 8-feet to 28-feet, and as will be more fully explained, scanner 10, as a cant passes beneath it, views only about a 1.5-inch portion of the total length of the cant. Accordingly, and in order to accommodate, and monitor properly, a cant along its entire length, a plurality of scanners, like scanner 10, are distributed along an axis which is normal to the plane of FIG. 1 and which substantially parallels the long axes of underpassing cants. Each other scanner in this installation is constructed, and works, in substantially exactly the same manner which will be described herein for scanner 10. Experience has shown that with each such scanner taking a narrow view of but a small portion of a cant, as generally mentioned, by placing adjacent scanners about 1-foot apart, very reliable cross-sectional profiling of a cant is possible. Accordingly, scanner 10, and its companions in the installation now being described, are distributed along the axis just mentioned on 1-foot center-to-center positions.

Cants, such as cant 12, which pass beneath the scanner for profiling purposes have come, in the installation now being described, from a re-saw station wherein thicker cants, cut directly by a head-rig saw, have been cut into thinner cants. The head-rig saw produces cants having a thickness of about 4-inches. The re-saw station produces cants having a thickness of about 1.6-inches. Because of the well known fact that during head-rig cutting and re-sawing the saw blades can wander laterally, no two cants will necessarily have the same thickness, and may vary from one to another. Also, thickness within a single cant can also vary.

The transport system, mentioned earlier, which is provided for shifting a cant beneath scanner 10 is located in such a manner that a cant having the desired thickness of exactly 1.6-inches, travels with its upper surface lying in what is referred to herein as a defined or selected datum plane, which plane is indicated in FIG. 1 at 16. Shown at A in FIG. 1, by two dash-dot lines which are parallel to, and on opposite sides of, the line representing plane 16, is an acceptable range of cant thicknesses for subsequent processing. These two dash-dot lines, with respect to the spacing between them, are located at unequal distances above and below plane 16. The upper of the two lines represents a thickness exceeding 1.6-inches by about 0.25-inches, and the lower line represents a thickness which is about 0.025-inches less 1.6 than 4-inches. As can be seen, cant 12 has a thickness in excess of 1.6-inches, as a consequence of which its upper surface lies above plane 16 as indicated by dash-double-dot line 18. In the particular illustration herein, the thickness of cant 12 exceeds 1.6-inches by about 0.1-inches.

Included in scanner 10 are two light-source units 20, 22, and a reflected light light-sensing unit, or means, 24. Generally speaking, units 20, 22, 24 operate in what may be thought of as the plane of FIG. 1. Units 20, 22 operate along axes which are disposed at a right angle to one another, and each at a 45° angle with respect to plane 16. The axis for unit 20 is shown by dash-dot line 26, and that for unit 22 is shown by dash-dot line 28. The operating axis of unit 24, which axis is shown by dash-dot line 30 is normal to plane 16. These three axes all intersect plane 16 at a common point which is shown at 32.

Figures 2, 3, 4, 5:
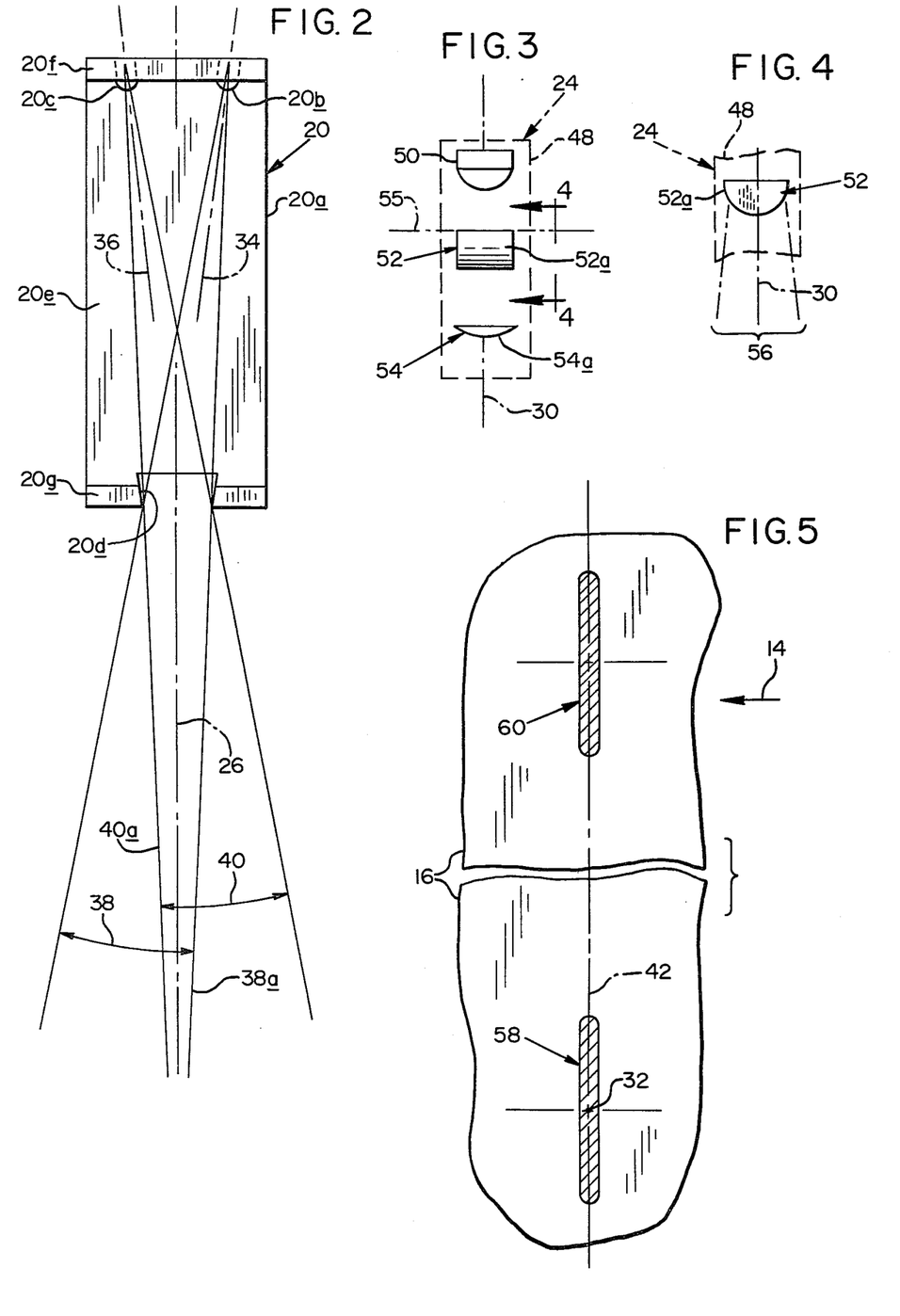
FIG. 2 is a view taken generally in the area in FIG. 1 enclosed by the curved arrow 2—2, showing the construction of a light-source unit employed in the apparatus of FIG. 1.
FIG. 3 is a schematic detail taken generally from the area in FIG. 1 embraced by the curved line 3—3, showing the construction of a photodetector unit in the apparatus of FIG. 1.
FIG. 4 is a detail of a cylindrical lens taken generally along the line 4—4 in FIG. 3.
FIG. 5 is a fragmentary view taken generally along the line 5—5 in FIG. 1, illustrating view fields characterizing the operation of the apparatus of FIG. 1.

Considering FIG. 2 along with FIG. 1, light-source unit 20 includes a frame 20a, a pair of infrared light-emitting diodes 20b, 20c mounted on frame 20a, and a beam-defining aperture 20d formed, as will be explained, in frame 20a. FIG. 1 shows unit 20 in schematic form only. FIG. 2 shows an exact construction which has been used successfully for unit 20. Thus, and referring especially to FIG. 2, frame 20a herein takes the form of a channel section having a main web 20e which spans and joins integrcally with a pair of flanges 20f, 20g which project toward the viewer in FIG. 2. Diodes 20b, 20c are mounted in suitable accommodating bores provided in flange 20f. Diode 20b is so mounted that it projects along an axis 34 which lies in the plane of FIG. 2, and which, progressing from the diode along the axis toward aperture 20d, converges upon axis 26 at an angle of about 4°. Similarly, diode 20c is mounted to project along an axis 36 which also lies in the plane of FIG. 2, and which, progressing therealong in the direction just mentioned, also converges on axis 26 at an angle of about 4°.

Aperture 20d takes the form of an underbeveled notch which is cut centrally in flange 20g, and partially into web 20e, as shown. Each angled side of this notch, progressing downwardly therealong in FIG. 2 converges toward axis 26 at an angle of about 6°. The narrowest portion of aperture 20d, measured at the base of flange 20g in FIG. 2 is about 0.6-inches. The center-line separation between diodes 20b 20c is about 0.93-inches. The overall height in FIG. 2 of the channel which forms frame 20a is about 4-inches.

Considering now again FIGS. 1 and 2 together, with diode 20b lit, aperture 20d cooperates therewith to define a projected beam for the diode which is shown at 38. Similarly, with diode 20c lit, aperture 20d defines for it a projected beam which is shown at 40. What is referred to herein as the upper defined surface in beam 38, represented by line 38a, extends in a plane which is normal to the planes of FIGS. 1 and 2, and intersects plane 16 along a line which is normal to the viewer in FIG. 1—which line contains previously mentioned point 32. This line, which is referred to as a common line herein, is shown by dash-dot line 42 in FIG. 5. What is referred to herein as the defined lower surface of beam 40, represented by line 40a, likewise extends in a plane which is normal to the planes of FIGS. 1 and 2, and intersects plane 16 along common line 42.

Light-source unit 22 is a mirror-image copy of unit 20. Thus, it includes a frame 22a, a pair of infrared light-emitting diodes 22b, 22c, and a beam-defining aperture 22d. The arrangement of components, and the dimensions, in unit 22 are the same as those just described for unit 20.

With the diode 22b lit, aperture 22d defines for it a projected beam which is shown at 44 in FIG. 2. With diode 22c lit, aperture 22d defines for it a projected beam which is shown at 46. The upper surface of beam 44, shown at 44a, extends in a plane which is normal to the plane of FIG. 1, and intersects plane 16 along common line 42. Similarly, the lower surface of beam 46, shown at 46a, extends in a plane normal to the plane of FIG. 1, and intersects plane 16 along common line 42. Thus, beam 44 is the mirror-image counterpart of beam 38, and beam 46 is the mirror-image counterpart of beam 40.

From the beam geometry which has just been described for units 20, 22, it will be apparent that beams 38, 44 overlap substantially only in a region beginning at common line 42 and extending beneath plane 16. Similarly, beams 40, 46 overlap substantially only in a region beginning with common line 42 and extending above plane 16. These regions of overlap are referred to herein as preferential illumination zones.

Referring to FIGS. 3 and 4 along with FIG. 1, light-sensing unit 24 includes a housing 48 inside of which are suitably mounted a phototransistor 50, a cylindrical lens 52, and a spherical lens 54. These three main elements in unit 24 are positioned coaxially on previously mentioned axis 30. Lens 52 includes a semi-cylindrical surface 52a which curves symmetrically about a line 55 which is horizontal and within the plane of FIG. 3, and horizontal and normal to the plane of FIG. 4. Lens 54 takes the form of a segment of a sphere, and includes a segmented spherical surface 54a which is disposed as a surface of revolution symmetric with respect to axis 30.

Lens 52 acts to spread the generally linear axial viewing field of phototransistor 50 into a plane, which, in FIG. 3, is normal to the plane of this figure and contains axis 30, and which, in FIG. 4, lies in the plane of that figure. A fragment of this viewing plane is indicated by bracket 56 in FIG. 4. Lens 54 acts to focus the "attention" of the thus-defined planar view field produced by lens 52 onto plane 16.

Referring to FIG. 5 along with the other figures, the "attention" of phototransistor 50 is focused onto plane 16 at the shaded area shown generally at 58 in FIG. 5. As can be seen, area 58 extends along common line 42, and is longitudinally centered with respect to previously mentioned common point 32. In scanner 10, area 58 has a length of about 1.5-inches, and a width of about 0.125-inches. As was mentioned previously, scanner 10 forms part of an installation of successive side-by-side adjacent scanners, and in FIG. 5, generally at 60, is shown the defined viewing area provided for the next adjacent scanner on the far side of scanner 10 in FIG. 1.

Referring again solely to FIG. 1, shown at 61 is an incandescent lamp. Lamp 61 is located on axis 30 beneath plane 16, and is aimed toward light-sensing unit 24.

According to an important feature of the invention, the diodes in each of units 20, 22 in scanner 10 are turned on and off in alternate bursts. More specifically, diodes 20b, 22b are turned on simultaneously, with diodes 20c, 22c off, and diodes 20c, 22c are turned on simultaneously with diodes 20b, 22b off. Under such circumstances, phototransistor 50 looks for surface light reflections, and produces an output signal whose level is proportional to the received reflected illumination level. Also, the output signal which is thus produced by the phototransistor is gated, as will be explained, to be made available only during the alternate times that the diodes in units 20, 22 are energized. In other words, the signal so produced by the phototransistor is gated to be receivable only when either diodes 20b 22b are on, or when diodes 20c, 22c are on. Energizing of the diodes, and gating of the output signal from the phototransistor, are under the control of a control circuit which is shown generally at 62 in FIG. 1, and in much greater detail in FIG. 6, to which attention is now directed.

Figure 6:
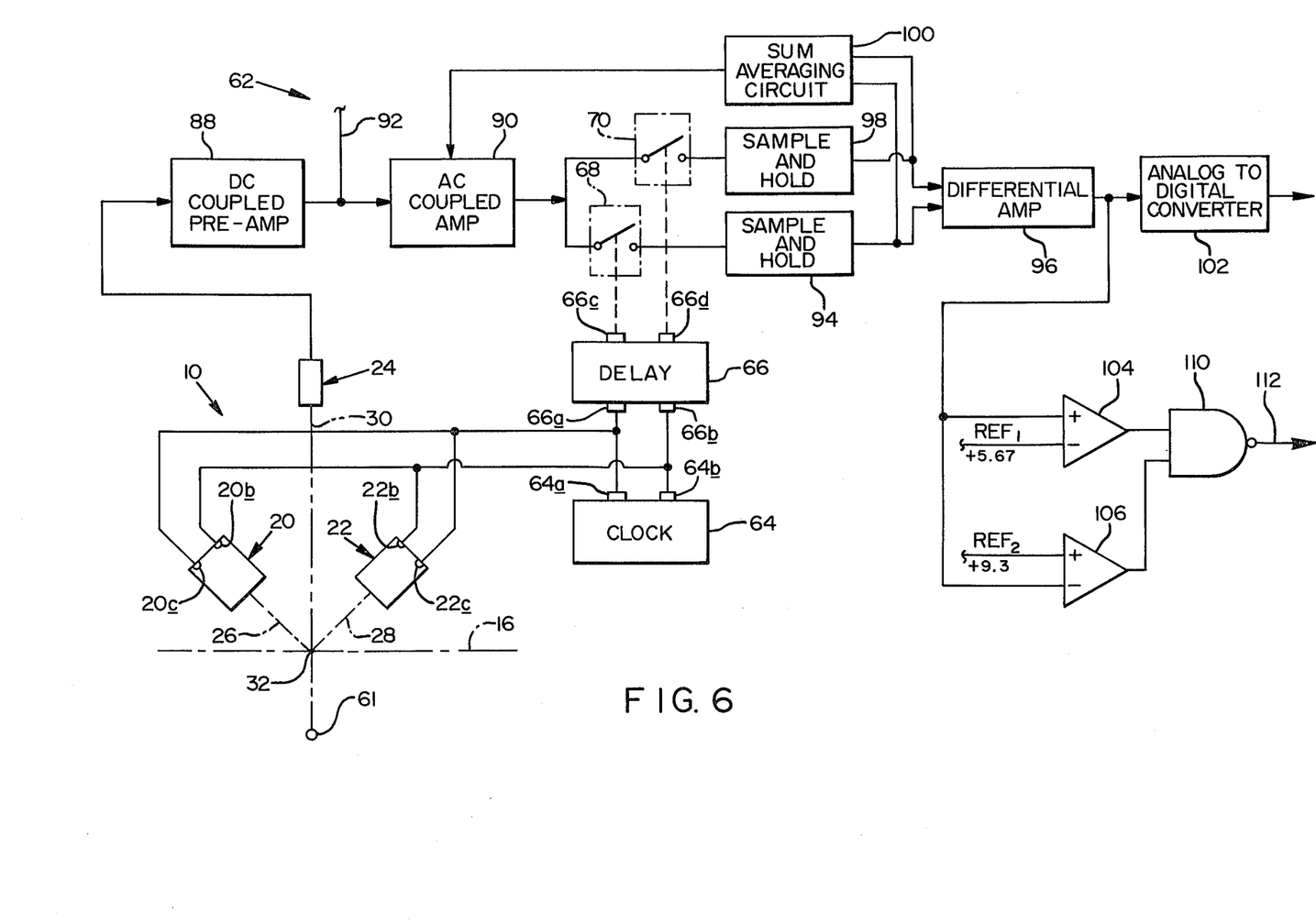
FIG. 6 is a block circuit diagram illustrating what is labeled in FIG. 1 as a control circuit.

Included in circuit 62 for producing certain control pulses are a clock 64 and a delay circuit 66. Clock 64 includes outputs 64a, 64b. Delay circuit 66 includes inputs 66a, 66b, and respectively related outputs 66c, 66d. Output 64a is connected as shown to input 66a, and also to light-emitting diodes 20c, 22c. Output 64b is connected as shown to input 66b, and to light-emitting diodes 20b, 22b.

Indicated generally at 68, 70 are two conventional pulse-responsive electronic switches which are connected, for "actuation", in a conventional manner to delay circuit outputs 66c, 66d, respectively.

Figure 7:
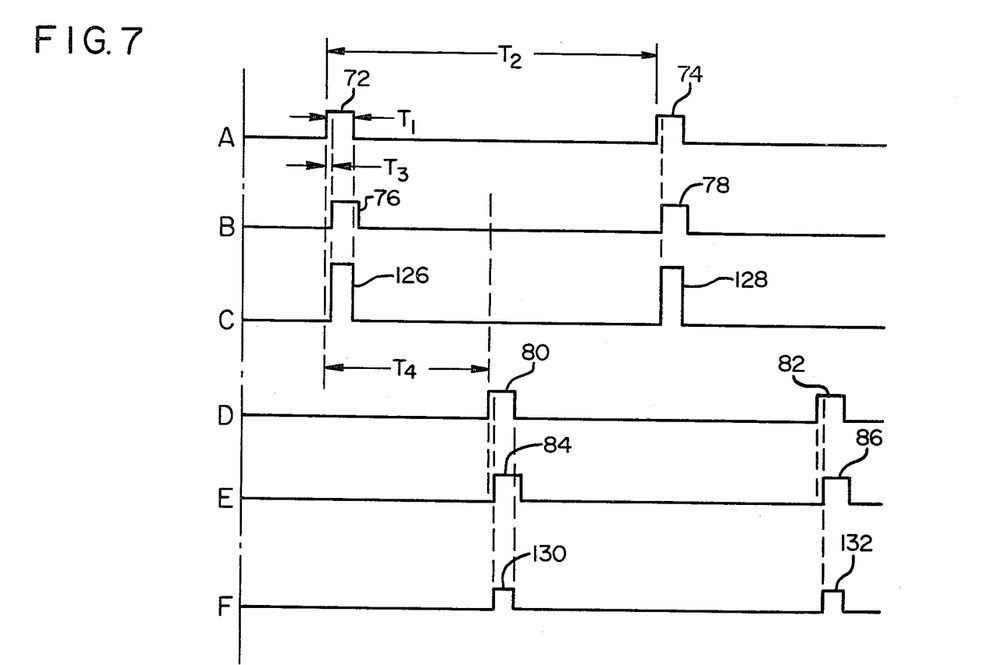
FIG. 7 shows, on a common time scale, various voltage wave forms which characterize the operation of the circuit shown in FIG. 6.

Referring to FIG. 7 along with FIG. 6 indicated at A, B, D, E are voltage wave forms depicting the operations of clock 64 and delay circuit 66. What is shown at A represents a voltage wave form produced on clock output terminal 64a. What is shown at B represents a voltage wave form produced on delay circuit output 66c. D reflects the voltage wave form produced on clock output 64b, and E represents the voltage wave form produced on output 66d.

Referring to A, here there are shown at 72, 74 two of the many successive time-adjacent voltage pulses produced on output 64a. Each pulse has a width, shown at $T_1$ for pulse 72, of about 18-microseconds. The period for successive adjacent pulses, shown at $T_2$, is about 0.0002-seconds. Pulses 72, 74, when applied in succession to delay circuit input 66a, result in the delay circuit producing on its output terminal 66c, two delayed, but correspondingly spaced, pulses 76, 78, respectively, shown in wave form B. Each of these latter-mentioned pulses is delayed by an interval, shown at $T_3$, of about 100-nanoseconds. Pulses 76, 78 have the same widths as pulses 72, 74.

Wave forms D and E, similarly, depict the voltage situations appearing on outputs 64b, 66d, respectively. Thus, in wave form D, two of the many successive time-adjacent voltage pulses which are produced on clock output 64b are shown at 80, 82. Pulses 80, 82 each have the same widths as pulses 72, 74, and also occur with the same period. However, each pulse in wave form D falls, time-wise, equidistant between the two pulses in wave form A. In other words, pulse 80 occurs a time interval, indicated at $T_4$, of about 0.0001-seconds after the beginning of pulse 72.

With respect to pulses 80, 82, and other succeeding pulses in wave form D, delay circuit 66 responds on its output terminal 66d with voltage pulses like those produced on output 66c. Wave form E shows, at 84, 86, two of such voltage pulses. Pulse 84 is produced in response to 80, has the same width, and is delayed by the same time delay interval mentioned earlier and indicated at $T_3$ in FIG. 7. Pulse 86, likewise, results from pulse 82.

With each voltage pulse, like pulse 72, produced on clock output 64a, diodes 20c, 22c turn on for the length of the pulse. Also, delay circuit 66 produces on output 66c a corresponding delayed pulse which causes, for the duration of that pulse, closure of electronic switch 68. Each pulse produced on output 64b causes turning on of diodes 20b, 22b, and similar time-delayed closure of electronic switch 70.

Continuing with a description of what is shown in FIG. 6, the output from phototransistor 50 is connected to the input of a DC-coupled preamplifier 88, whose output is coupled, in turn, to the input of an AC-coupled amplifier 90, and also to a conductor 92 whose purpose will be explained shortly. The output of amplifier 90 feeds in parallel the inputs to switches 68, 70. The output of switch 68 couples to the input of a conventional sample-and-hold circuit 94, whose output feeds one of the two inputs in a differential amplifier 96. Similarly, the output of switch 70 feeds the input of another sample-and-hold circuit 98, whose output is coupled to the other of the two inputs in amplifier 96.

Amplifier 90 is gain-controllable, and connected to its gain-control input is the output of a conventional sum-averaging circuit 100 which has two inputs, each connected to an output of one of the two sample-and-hold circuits, as shown.

The output of amplifier 96 is coupled to the input of a conventional analog-to-digital converter 102, to the non-inverting input of an operational amplifier 104, and to the inverting input of another operational amplifier 106. The output of converter 102 is coupled in a well known fashion to a conventional digital computer, which is shown in block form at 108 in FIG. 1. The outputs of amplifiers 104, 106 are each coupled to a different one of the two inputs in a two-input NAND-gate 110 whose output is connected via a conductor 112 to a suitable input port in computer 108.

Remaining aspects of scanner 10, and of the system including this scanner, will be described in conjunction with an operational explanation respecting the scanning of cant 12.

Through apparatus which forms no part of the present invention, and which is conventional in construction, the linear travel speed of cant 12 in the direction of arrow 14 is monitored, and is "known", on an instantaneous basis by computer 108.

Ordinarily, cants which are to be scanned in a typical saw mill follow one another in rather close proximity. However, for the purpose of explanation herein, only a single cant, 12, is shown in FIG. 1, and is illustrated at a fair distance from the field of view of sensing unit 24. Under these circumstances, phototransistor 50 is flooded with light from lamp 61, and produces a positive DC output voltage (whose exact level is not critical). This voltage is coupled through preamplifier 88 to conductor 92, and to the input of amplifier 90. With regard to amplifier 90, inasmuch as it is an AC-coupled amplifier, the DC voltage produces no related effect on the output of amplifier 90.

Conductor 92 is coupled, in a conventional manner, to the count-inhibiting input in a conventional digital counting circuit (not shown), which includes its own internal source of clock pulses, and one or more registers or counters for counting these pulses. The output of this counting circuit is conventional coupled to an input port in computer 108.

So long as the DC voltage just mentioned is present on conductor 92, the counting circuit just referred to is inhibited from counting, and feeds no counting data to the computer.

This situation changes when a leading-edge portion of an oncoming cant, such as edge portion 12A in cant 12, interrupts the optical path between lamp 61 and sensing unit 24. On such occurring, the DC voltage previously produced by phototransistor 50 drops, and this drop results in the counting circuit discussed above beginning counting. So long as the cant is positioned between unit 24 and lamp 61, counting continues. When a trailing-edge portion of cant 12, such as edge portion 12D, moves to expose the path between the lamp and unit 24, the counting circuit stops counting.

As a consequence, computer 108 receives counting data which, in conjunction with its "continuous knowledge" regarding the travel speed of cant 12, enables it to compute the overall width, $W_1$, of the cant in the region viewed by unit 24. While knowledge of this width is, of course, necessary to accurate profiling of the cant, the means for determining width, and the steps involved in making such a determination, are conventional, and thus are not described herein in any further detail.

Whenever an object passes into the field of view of unit 24, with a surface illuminated by the light-emitting diodes in units 20, 22, reflected light is received by unit 24 which produces a voltage whose level is related to the level of reflected illumination. More specifically, under the circumstance just described, during an interval with diodes 20c, 22c lit, a corresponding voltage pulse is produced by phototransistor 50 and is processed and coupled through preamplifier 88 and amplifier 90 to the inputs to switches 68, 70. Immediately following turning on of these two light-emitting diodes, delay circuit 66 closes switch 68, whereupon the level of the processed and amplified pulse is stored in sample-and-hold circuit 94, and is applied to one of the two inputs in differential amplifier 96, and to one of the two imputs in circuit 100.

Shortly thereafter, and as will be apparent from the discussion presented earlier with respect to FIG. 7, clock 64 supplies a pulse which turns on diodes 20b, 22b. When this occurs, phototransistor 50 again produces a voltage pulse which is and coupled through preamplifier 88 and amplifier 90, and applied to the inputs to switches 68, 70. Under this circumstance, however, switch 70 becomes closed, whereupon the level of this new processed and amplified voltage pulse is captured and held in sample-and-hold circuit 98, and applied to the other inputs in amplifier 96 and circuit 100.

The function of delay circuit 66 is to ensure closed conditions in switches 68, 70 only at times when the level of a voltage pulse on the output of amplifier 90 has substantially stabilized at its maximum value.

Amplifier 96, with voltage levels applied to its two inputs, produces a DC output voltage whose level is proportional to the difference between the input voltage levels. This output voltage is applied to the input to analog-to-digital converter 102, to the non-inverting input of operational amplifier 104, and to the inverting input of operational amplifier 106. In the apparatus now being described, differential amplifier 96 is powered and biased in such a manner that, when there is no difference in the level between the voltages applied to its two inputs, it applies to its output a DC voltage of about +6-volts.

The circuitry in FIG. 6 relating to the feeding in of voltages to amplifier 96 is such that a reflecting surface which is located below plane 16 causes the amplifier to produce a voltage which is less than +6-volts, and that a reflecting surface which is above plane 16 causes the amplifier to produce a voltage which exceeds +6-volts. Within a given distance range which is distributed equally on opposite sides of plane 16, the output voltage produced by amplifier 96 exhibits a substantially linear relationship respecting the position of such a surface within the range.

Figure 8:
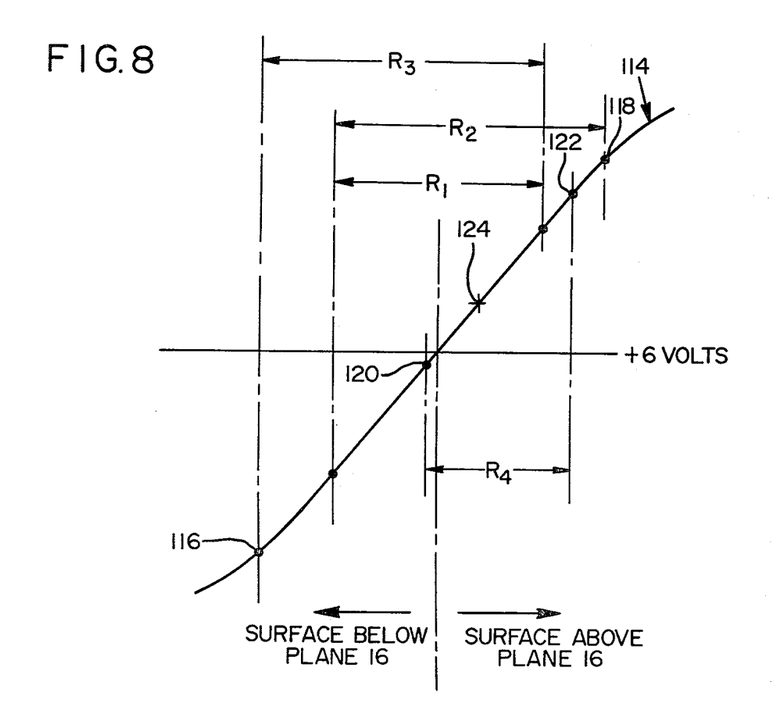
FIG. 8 is a plot of voltage versus distance which illustrates the output signal developed in a differential amplifier in the circuit in FIG. 6—which signal is usable to indicate directly the position of a cant surface relative to what is referred to herein as a selected or defined datum plane.

Referring to FIG. 8, here there is shown by a line, or curve, 114, a graph of the output voltage characteristic for amplifier 96. The vertical axis in the figure represents voltage, and the horizontal axis represents distance. Curve 114 extends as shown through the point of intersection between the vertical and horizontal axes. At this point of intersection, the output voltage of amplifier 96 is +6-volts, which voltage has resulted from a reflecting surface, within the field of view of unit 24, lying exactly in plane 16. Progressing to the right of this point of intersection, the graph indicates that, as a reflecting surface is further and further above plane 16, the voltage output of amplifier 96 climbs above +6-volts. Similarly, to the left of this point of intersection in FIG. 8, surfaces which are progressively lower than plane 16 cause progressively lower than +6-volt output from amplifier 96.

As a consequence of the geometries and positionings of units 22, 24 in scanner 10, there is a finite portion of curve 114 which exhibits substantial linearity. This portion is defined between points 116, 118. Point 116 represents a voltage of +2-volts, and a reflecting surface located at 0.3-inches below plane 16. Point 118 represents a voltage of +10-volts and a reflecting surface located 0.3-inches above plane 116. Therefore it will be apparent that in scanner 10, there is a linear dynamic response range of 0.6-inches, distributed symmetrically on opposite sides of plane 16, which range is characterized by a voltage range of 8-volts arranged symmetrically on opposite sides of a nominal voltage +6-volts.

One of the important features of the present invention is that the effective response range, within the total linear range just described, in scanner 10 can be adjusted to suit different circumstances. This is accomplished through settings of the DC bias voltages which are applied to the inverting input of amplifier 104, and to the non-inverting input of amplifier 106. The level of bias voltage applied to the inverting input of amplifier 104 determines the extent of the effective range along the lower left portion of curve 114 in FIG. 8. Similarly, the bias voltage level applied to the non-inverting input of amplifier 106 determines the extent of the effective range along the upper right portion of curve 114. Obviously, with the circuitry construction shown herein, upper and lower limits of the effective range are independently, and infinitely adjustable.

Referring to FIG. 8, indicated at $R_1$, $R_2$, $R_3$ and $R_4$ are four different adjusted linear ranges. Range $R_1$ represents a contraction from both ends of the total available linear range. Range $R_2$ represents a contraction from the bottom end of the total range. Range $R_3$ represents a contraction from the upper end of the total range. Range $R_4$ represents the actual range which has been set herein, in accordance with what is shown at A in FIG. 1. More specifically, the bottom side of range A resides about 0.025-inches below plane 16, and with respect to FIG. 8, this relates to a voltage of about 0.33-volts less than +6.0-volts. Accordingly, a bias voltage of about +5.67-volts is applied to the inverting input of amplifier 104. This point along curve 114 is shown at 120. The upper side of range A resides about 0.225-inches above plane 16, and this corresponds, with reference to FIG. 8, to a voltage of about 3.3-volts above +6.0-volts. Accordingly, a bias voltage of about +9.3-volts is applied to the non-inverting input of amplifier 106, and this results in the upper end of range $R_4$ being designated in FIG. 8 by point 122.

Referring for a moment particularly to FIG. 6, so long as the voltage applied to the non-inverting input of amplifier 104 is at least equal to +5.67-volts, the output terminal of this amplifier remains in a positive-voltage condition which will be referred to herein as a "1" state. Whenever such voltage falls below +5.67-volts, the output of amplifier 104 drops substantially to a ground-potential voltage, which is referred to herein as a "0" state. Similarly, so long as the voltage applied to the inverting input of amplifier 106 remains no greater than +9.3-volts, the output terminal of amplifier 106 remains in a "1" state. When such voltage exceeds +9.3-volts, the output of the amplifier is placed in a "0" state.

Accordingly, so long as the voltage on the output of differential amplifier 96 remains in a range no less than +5.67-volts, and no greater than +9.3-volts, the outputs of both amplifiers 104, 106 remain in "1" states. With these two outputs in "1" state, the output of NAND-gate 110, as applied to conductor 112, remains in a "0" state.

Whenever the output voltage of amplifier 96 "crosses" these two voltage limits, in either direction, one of the inputs of NAND-gate 110 is placed in a "0" state, whereupon its output is placed in a "1" state. As will become apparent, amplifiers 104, 106, in cooperation with gate 110, function to provide an input signal for computer 108, which signal indicates whether the thickness of a cant, as viewed by scanner 10, is within what has been set (by the bias voltages provided for the amplifiers) as a preselected range of acceptable thicknesses. In the case now being described, this acceptable range of thicknesses is between 1.575-inches and 1.85-inches.

Considering now an actual scanning operation involving cant 12, as the cant travels in the direction of arrow 14 in FIG. 1, edge portion 12A eventually intersects axis 30, and cuts off the optical path between unit 24 and lamp 61. When this occurs, the counting circuit previously mentioned begins counting, and computer 108, responding to this circuit, and to its "knowledge" of the instantaneous travel speed of the cant, begins to store continuously updating data indicative of the width of the cant in the region beneath unit 24.

When edge portion 12A so intersects axis 30, and with units 20, 22 operating as described, light, in time-spaced pulses, is reflected toward the phototransistor in unit 24. Because of the fact that edge portion 12A is well below plane 16, the reflected light pulses which are received by the phototransistor as a consequence of lighting by diodes 20b, 22b will be larger in illumination level than the pulses resulting from illumination by diodes 20c, 22c. As these light pulses arrive at the phototransistor, the latter produces a proportionate DC voltage pulse which is coupled and processed through preamplifier 88 and amplifier 90, and switched to the appropriate one of sample-and-hold circuits 94, 98, as previously described. Once the sample-and-hold circuits have begun to acquire and store voltage data, they supply different-level DC voltages to the inputs in differential amplifier 96 and in circuit 100. Amplifier 96, then, produces a DC voltage somewhere along curve 114 shown in FIG. 8. Initially, the output voltage of amplifier 96 will be well below +6-volts, and would be plotable as a point along curve 114 toward the lower left extremity thereof in FIG. 8—outside what has previously been referred to as the linear or substantially linear portion of the curve.

As the cant continues to advance beneath unit 24, and for a certain period of time, reflected light pulses will occur from progressively closer locations beneath plane 16. Accordingly, the differences in the levels of voltage pulses produced by phototransistor 50, as a consequence of operation of the two different simultaneously pulsed pairs of light-emitting diodes, will progressively decrease, and will cause the output voltage of amplifier 96 progressively to climb toward +6-volts. The +6-volt output level for amplifier 96 will, of course, be reached when the point on the left-hand wane in cant 12 from which reflection occurs is substantially exactly at the level of plane 16.

Recalling the fact that, because cant 12 has the thickness of about 1.7-inches, its upper surface lies above plane 16. As the cant continues to move beyond the point at which amplifier 96 produces a +6-volt output signal, and for a relatively short time thereafter, the point from which light reflection is sensed by phototransistor 50 continues to climb relative to plane 16, and now, climbs above the level of the plane. Under these circumstances, the level of voltage pulses from phototransistor 50 resulting from illumination by diodes 20c, 22c will exceed that of voltage pulses resulting from illumination by diodes 20b, 22b. This, then, results in a situation with the output voltage of amplifier 96 progressively exceeding +6-volts.

When the edge portion defining the intersection between the left-hand wane in cant 12 in the upper surface of the cant, namely edge portion 12B, intersects axis 30, and assuming for the sake of illustration that, in the region beneath unit 24, cant 12 has a uniform thickness, continued movement of the cant will produce light reflections occurring from the same level above plane 16. As a consequence, the output voltage from amplifier 96 will remain substantially uniform at a DC voltage above +6-volts. In the example which is now being described, and with cant 12 having a thickness of about 1.7-inches, the output voltage of amplifier 96 will exceed +6-volts by about 1.33-volts—to a level of about +7.33-volts. This point along curve 114 in FIG. 8 is indicated by the "X" marked at 124 in the figure.

Throughout the entirety of the operation which has so far been described, once the leading edge portion, 12A, of cant 12 has intersected axis 30, and the counting circuit has begun counting, computer 108 not only accumulates data indicative of cant width, but also, through analog-to-digital converter 102, acquires data from amplifier 96 indicating whether what is being viewed is the flat surface of a cant, or a wane therein. Because of the fact that the initially acquired data from converter 102 indicates a progressively rising output voltage in amplifier 96, the computer, through conventional programing which defines its operation, "knows" that what is being viewed beneath unit 24 is what will be referred to herein as the leading-edge wane in cant 12. Once the output voltage from amplifier 96 stabilizes, the computer then "knows" that the top flat surface of the cant is in the field of view of phototransistor 50, and further, and from the level of the output voltage of amplifier 96, knows, distance-wise, where in relation to plane 16 this surface lies. In the case of cant 12, the computer "knows" that the upper surface of cant 12, beneath unit 24, is above plane 16 by about 0.1-inches.

Referring for a moment to FIG. 7 to consider the voltage-pulse situation which characterizes this condition of viewing the top surface of cant 12, indicated at 126, 128 in wave form C are two of the successive pulses which are produced on the output of amplifier 90 as a consequence of illumination by diodes 20c, 22c. These pulses are supplied through switch 68 to sample-and-hold circuit 94. The two pulses are identical, and referring to pulse 126, the same has a leading edge corresponding in time to the leading edge of pulse 76, and a trailing edge corresponding in time to the trailing edge of pulse 72. The reason that pulse 126 is narrower than either of pulses 72, 76, is that the pulse cannot begin until closure of switch 68, which is initiated by the leading edge of pulse 76, and must terminate when diodes 20c, 22c turn off, which corresponds in time to the trailing edge of pulse 72.

Referring to wave form F in FIG. 7, indicated at 130, 132 are two of the successive pulses which are applied through switch 70 to the input of sample-and-hold circuit 98 as a consequence of illumination by diodes 20b, 22b. Pulses 130, 132 are substantially identical, and have substantially the same time-widths as pulses 126, 128. However, the amplitudes of pulses 130, 132 are less than the amplitudes of pulses 126, 128, because of the fact that the reflecting surface is located above the level of plane 16.

This situation continues until the opposite edge portion of the cant's upper surface, portion 12C, is reached. On this occurring, and with continued transport of the cant, the voltage output of amplifier 96 begins to drop in a manner related to the slope of the trailing-edge wane in the cant. When trailing edge portion 12D in the cant passes beyond axis 30, phototransistor 50 is again exposed to lamp 61, and the counting circuit is shut off.

Describing in a little more detail what occurs during the time that the viewing field of unit 24 is exposed to the cant's substantially flat upper surface, when the computer "notes" stabilization, or substantial stabilization of the output voltage of amplifier 96, such information being derived through converter 102, it examines the output condition of NAND-gate 110 to gain an indication of whether the thickness of the cant, in the region scanned by scanner 10, is within the predetermined acceptable thickness range. In the case of cant 12, the same has an acceptable thickness, resulting in the output of gate 110 being in a "0" state. Noting this, while simultaneously examining the output conditions of the other NAND-gates associated with the other scanners in the total system, and assuming that the latter all display "0" states, the computer allows the cant to continue through the mill for subsequent processing.

In the case of a cant passing through the system which is too thin, in accordance with the established acceptable thickness range, it is typical that such a cant will be ejected from the ordinary mill processing route for handling in some other manner. The reason for this is that one of the subsequent processing steps is typically planing, and a too-thin cant would simply waste mill operating time in being passed through a planar which would not touch it. In the case of a cant which is too thick, in accordance with the established range, such a cant might typically be allowed to continue along the regular processing route, with a notation made by the computer, for indicating to the mill operator, that the saws which are preparing the cants are allowing too much thickness in them. Other options are, of course, possible for handling cants whose thicknesses are either too great or too small.

After a cant, such as cant 12, has passed beneath the scanners, like scanner 10, computer 108 has acquired accurate data depicting the cant's cross-sectional profile, at displaced 1-foot intervals along the total length of the cant. For example, at each scanning location, and considering the scanning location under unit 24, the computer "knows" the overall width of the cant, indicated in FIG. 1 at $W_1$, the width of the top face of the cant, indicated at $W_2$, and the slopes and shapes of the leading-edge and trailing-edge wanes.

From this acquired data, and from a computational process which forms no part of the present invention, the computer determines how the cant should be oriented relative to edger saw blades to trim off the wanes, in such a manner as to maximize yield from the cant.

In response to the voltages appearing on the outputs of circuits 94, 98, circuit 100 generates, in a well-known fashion, a control voltage which, when applied to the gain-control input in amplifier 90, adjusts the gain therein to ignore changes in the level of reflected-light signals resulting from differences in cant-surface reflectance characteristics.

The apparatus of the invention thus features a unique construction which offers and attains all of the advantages ascribed to it earlier herein. Extremely accurate dimensional profiling of an object, such as a cant, is possible. With the apparatus having a definable, and infinitely variable, linear operating range to determine a measurement, such as cant thickness, the apparatus offers a high degree of flexibility and versatility in setting, for example, quality control standards.

A special and important feature of the invention, which contributes significantly to its reliability and predictable accuracy, is the fact that, with the light-emitting diodes in the light-source units pulsed on and off in pairs as described, so long as, within the viewing field of a light-sensing unit (such as unit 24) there is a surface capable of reflecting light back along axis 30, the signal level of the output signal produced by the phototransistor light sensing unit is substantially independent of the angle which that surfaces makes with respect to axis 30. In other words, as long as reflection as just outlined is possible, the apparatus of the invention is substantially angle-independent. Accordingly, even though, with respect to the Voltage vs. Distance curve illustrated in FIG. 8, the curve displays only a limited range of substantial linearity, the curvature defining the ends of this curve is always predictably the same. Therefore, data acquired during a time when the location of a reflecting surface is outside the linear range of curve 114 can nevertheless be used to compute accurately the profile of a viewed object.

It will be apparent to those skilled in the art that, while a preferred embodiment of the invention has been described in the setting of a system for profiling cants in a saw mill, the apparatus has a much wider range of utility, and can perform similar profiling activity in many other applications. Also, while a particular arrangement of apparatus has been described having a relatively small overall linear dynamic operating range, changes in the geometry of the apparatus can easily be made to extend or contract this range.

Accordingly, while a preferred embodiment of the invention has been shown and described, it is appreciated that variations and modifications may be made without departing from the spirit of the invention.

It is claimed and desired to secure by letters patent:

1. Apparatus for measuring, within a definable selectively variable range, the distance between an object's surface and a datum plane, said apparatus comprising,
    a pair of illumination sources each oriented to project a beam of light toward a common side of said plane, with one beam having a defined lower surface, and the other having a defined upper surface, said surfaces intersecting said plane generally along a common line within the plane,
    reflected illumination sensing means oriented to view said common side of said plane, and having a sensing axis which intersects said common line, said sensing means producing a signal related to the level of light reflected thereto from an object's surface located along said axis, and
    control circuitry, operatively connected to said sources and to said sensing means, operable with respect to the former to energize the same alternately, and with respect to the latter to generate a signal indicative of the distance, if any, within said selected range, of such an object's surface from said plane, and of the side of said plane on which such surface is located.

2. Apparatus for measuring, within a definable selectively variable range, the distance between an object's surface and a datum plane, said apparatus comprising,
    two pairs of illumination sources, each pair being oriented to project beams of light toward a common side of said plane, with one beam projected by each pair having a defined lower surface, and the other beam projected by each pair having a defined upper surface, all of said surfaces intersecting said plane generally along a common line within the plane,
    reflected illumination sensing means oriented to view said common side of said plane, and having a sensing axis which intersects said common line, said sensing means producing a signal related to the level of light reflected thereto from an object's surface located along said axis, and
    control circuitry operatively connected to said sources and to said sensing means, operable, with respect to said sources, to energize those sources projecting beams having defined lower surfaces alternately with the other sources, and with respect to said sensing means, to generate a signal indicative of the distance, if any, within said selected range, of such an object's surface from said plane, and of the side of said plane on which such surface is located.

3. Apparatus for measuring, within a definable selectively variable range, the distance between an object's surface and a datum plane, said apparatus comprising,
    a first pair of illumination sources each oriented to project a beam of light toward a common side of said plane, with one beam having a defined lower surface, and the other having a defined upper surface, said surfaces intersecting said datum plane generally along a common line within the plane,
    a second pair of illumination sources each oriented to project a beam of light toward said common side of said plane, with one beam having a defined lower surface, and the other having a defined upper surface, said surfaces intersecting said plane generally along said common line,
    an illumination sensing means, oriented to view said common side of said plane, responsive to light reflected thereto from an object's surface, said sensing means having a substantially planar viewing field extending therefrom which includes said common line, said sensing means producing a signal related to the level of light reflected thereto from an object's surface located along said axis, and
    control circuitry, operatively connected to said sources and to said sensing means, operable, with respect to said sources, to energize those sources projecting beams having defined lower surfaces alternately with the other sources, and with respect to said sensing means, to generate a signal indicative of the distance, if any, within said selected range, of such an object's surface from said plane, and of the side of said plane on which such surface is located.

4. The apparatus of claims 1 or 2 which further includes means forming a substantially planar light-viewing field extending from said sensing means along the sensing axis thereof, and through said datum plane, said field including said common line.

5. The apparatus of claims 1, 2 or 3, wherein said control circuitry further includes an automatic gain control, said control electronically maintaining the level of an output signal generated by the control circuitry independent of surface reflectivity in a viewed object.

* * * * *